(12) United States Patent
Padhiar et al.

(10) Patent No.: US 12,177,773 B2
(45) Date of Patent: *Dec. 24, 2024

(54) ENHANCED BROADBAND AND MOBILITY ACCESS

(71) Applicant: AT&T Intellectual Property I, L.P., Atlanta, GA (US)

(72) Inventors: Bhushan Padhiar, Frisco, TX (US); Stewart Barker, Lucas, TX (US); Abdellah Tazi, Redmond, WA (US); Lujing Cai, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/149,805

(22) Filed: Jan. 4, 2023

(65) Prior Publication Data
US 2023/0141944 A1    May 11, 2023

Related U.S. Application Data

(63) Continuation of application No. 17/101,163, filed on Nov. 23, 2020, now Pat. No. 11,553,412.

(51) Int. Cl.
*H04W 48/18* (2009.01)
*H04W 84/04* (2009.01)
*H04W 84/12* (2009.01)

(52) U.S. Cl.
CPC .......... *H04W 48/18* (2013.01); *H04W 84/042* (2013.01); *H04W 84/12* (2013.01)

(58) Field of Classification Search
CPC .... H04W 48/18; H04W 84/042; H04W 84/12
See application file for complete search history.

(56) References Cited

U.S. PATENT DOCUMENTS

| | | | |
|---|---|---|---|
| 2010/0027469 A1 | 2/2010 | Gurajala et al. | |
| 2020/0154272 A1* | 5/2020 | Uy | H04W 12/08 |
| 2020/0204974 A1* | 6/2020 | Strater | H04B 17/318 |
| 2020/0413491 A1 | 12/2020 | Ansley et al. | |
| 2021/0250196 A1 | 8/2021 | Das et al. | |
| 2021/0274416 A1 | 9/2021 | Jendli et al. | |
| 2022/0038954 A1* | 2/2022 | Ovadia | H04W 28/10 |
| 2022/0167258 A1 | 5/2022 | Padhiar et al. | |

* cited by examiner

*Primary Examiner* — Charles N Appiah
*Assistant Examiner* — Nicole M Louis-Fils
(74) *Attorney, Agent, or Firm* — Guntin & Gust, PLC; John G. Rauch

(57) ABSTRACT

Aspects of the subject disclosure may include, for example, a network communication device that includes a backhaul link circuit and a Wi-Fi access point to provide broadband services to a service provider's broadband customers and to provide mobility services to the service provider's mobility customers. This network communication device is installed outside of a dwelling unit in order to simplify the installation procedure and avoid property disruption. An extender device registered to a broadband customer user account may associate to the access point for seamless service. User equipment (UE) of the service provider's mobility customers may associate to the access point to receive Wi-Fi roaming services. Other embodiments are disclosed.

20 Claims, 10 Drawing Sheets

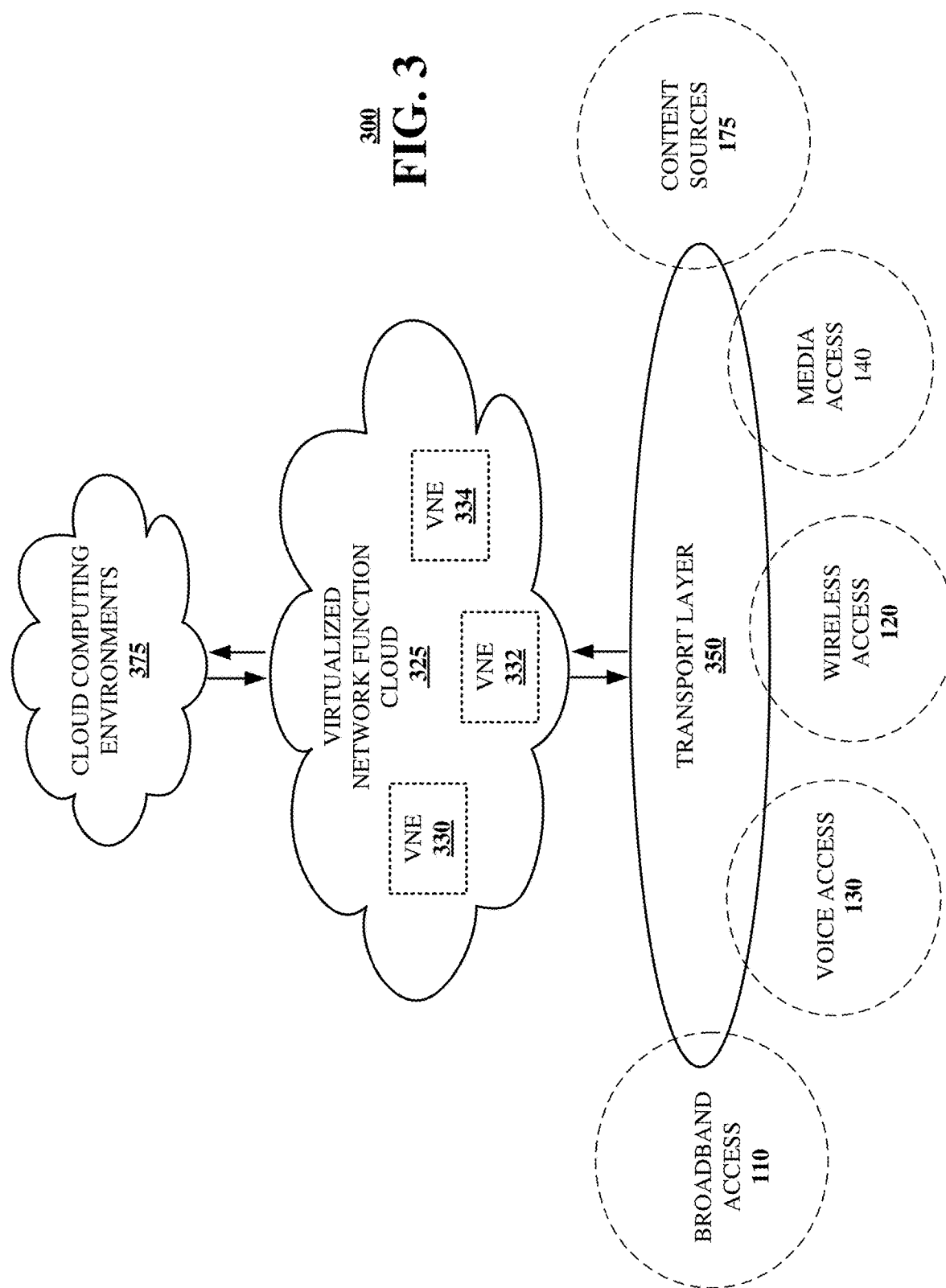

ENHANCED BROADBAND AND MOBILITY ACCESS

CROSS REFERENCE TO RELATED APPLICATIONS

This application is a continuation of U.S. patent application Ser. No. 17/101,163 filed on Nov. 23, 2020. All sections of the aforementioned application are incorporated herein by reference in their entirety.

FIELD OF THE DISCLOSURE

The subject disclosure relates to providing broadband service and mobility services to broadband customers and mobility customers.

BACKGROUND

Communication service providers typically provide services to broadband customers, mobility customers, or both. For example, a service provider may provide broadband data services to a broadband customer by running fiber to the home (FTTH), and providing a residential gateway (RG) for the customer to deploy inside the home. Also for example, a service provider may provide mobile data services to user equipment (UE) of mobility customers over a communications network such as a 3GPP 5G network.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
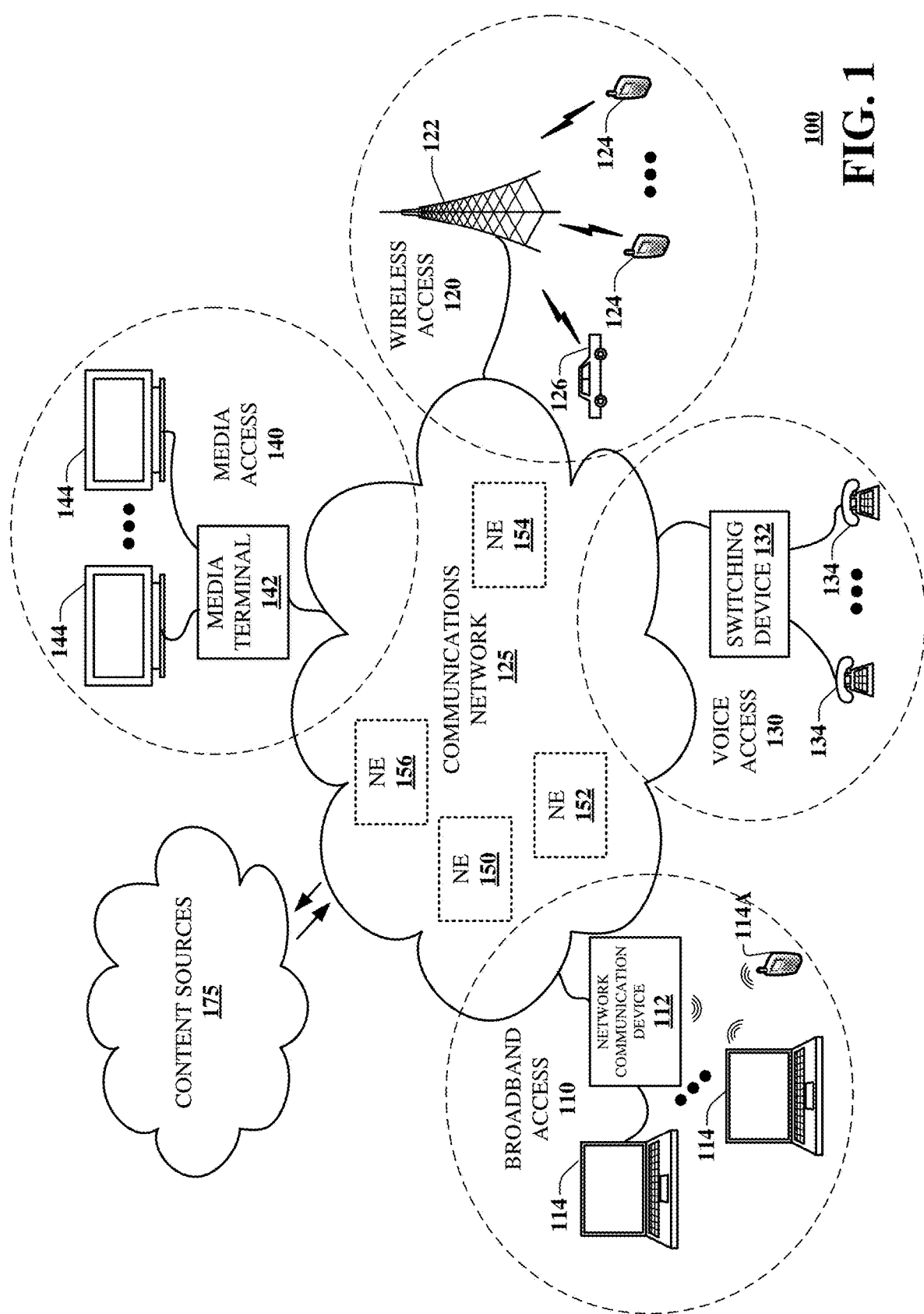
FIG. 1 is a block diagram illustrating an exemplary, non-limiting embodiment of a communications network in accordance with various aspects described herein.

The subject disclosure describes, among other things, illustrative embodiments for a network communication device that converges a backhaul link and wireless access into a building. The network communication device may be installed outside, thereby providing an outdoor demarcation point that includes both the backhaul link and wireless access into the building without necessarily requiring an installation technician to access the building interior. This installation procedure avoids property damage and bodily injury. It eliminates the dependency on hardwiring while reducing the technician installation hours. The network communication device may support broadband services in dwellings associated with broadband customer user accounts and may also provide mobile services to UEs associated with mobility customer user accounts via Wi-Fi roaming. Other embodiments are described in the subject disclosure.

One or more aspects of the subject disclosure provide a network communication device that includes a backhaul link circuit to communicate with a service provider's core network, wherein the service provider's core network provides broadband services to dwellings of the service provider's broadband customers and provides mobile data services to user equipment (UE) of the service provider's mobility customers. The network communication device may also include a Wi-Fi access point coupled to communicate with the backhaul link circuit, wherein the Wi-Fi access point is configured to associate to one or more extender devices having MAC addresses or SSID registered to one or more of the service provider's broadband customers, and wherein the access point is further configured to associate to one or more UE of the service provider's mobility customers to provide Wi-Fi roaming to the one or more UE of the service provider's mobility customers.

Some aspects of the subject disclosure provide a wired backhaul link circuit, and some aspects provide a wireless backhaul link circuit. For example, a wired backhaul link circuit may include any physical coupling, such as an optical fiber, between the backhaul link circuit and a core network. Also for example, a wireless backhaul link may include any radio circuitry, such as 3GPP 5G circuits, capable of communicating wirelessly with a core network.

Some aspects of the subject disclosure provide for extender devices having MAC addresses registered to a single broadband customer, and other aspects of the subject disclosure provide for extender devices having MAC addresses registered to more than one broadband customer. The network communication device may be installed in a location that can provide service to more than one broadband customer. For example, the network communication device may be located to provide to service to multiple dwellings in a multi-dwelling building, or may be located to provide service to adjacent buildings.

Some aspects of the subject disclosure provide for the network communication device to allow user equipment (UE) of mobility customers to associate to the Wi-Fi access point to provide Wi-Fi roaming services to the UE of the mobility customers.

One or more aspects of the subject disclosure provides a method for operating a communication network or a communication network device that includes receiving, at the a access point, a first association request to associate to the Wi-Fi access point, wherein the first association request is received from an extender device having a first MAC address; determining that the first MAC address is registered to a broadband customer user account of a service provider; associating the first extender device to the Wi-Fi access point; routing data traffic between the backhaul link circuit and a first mobile device through the extender device; receiving, at the Wi-Fi access point, a second association request from the first mobile device; determining that the first mobile device is registered to a mobility customer user account of the service provider; responsive to the determining that the first mobile device is registered to a first mobility customer user account of the service provider, associating the first mobile device to the Wi-Fi access point; and routing the data traffic to the first mobile device associated with the Wi-Fi access point.

A third request from a second mobile device may be received, and after determining the second mobile device is registered a second mobility customer user account of the service provider, the second mobile device may be allowed to associate to the Wi-Fi access point to provide Wi-Fi roaming services to the second mobile device.

In general, any number of extender devices providing broadband services to broadband customers of the service provider may be associated to the Wi-Fi access point. In some embodiments, the extender connects to the access point transmitting strongest signal. Similarly, in general, any number of UEs registered to mobility customers of the service provider may be associated to the Wi-Fi access point to provide Wi-Fi roaming to the UEs of the mobility customers.

Referring now to FIG. 1, a block diagram is shown illustrating an example, non-limiting embodiment of a system 100 in accordance with various aspects described herein. For example, system 100 can facilitate in whole or in part a network communication device that combines a backhaul link circuit and a wireless access point to provide both broadband services to broadband customers and mobility services to mobility customers. In particular, a communications network 125 is presented for providing broadband access 110 to a plurality of data terminals 114 via network communication device 112, mobility services to mobility device(s) 114A, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the network communication device 112 can include one or more backhaul link circuits such as a digital subscriber line access multiplexer (DSLAM), cable modem termination system (CMTS), optical line terminal (OLT), optical network terminal (ONT), a 3GPP 5G radio, mmWave, P2P Microwave Link and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2B:
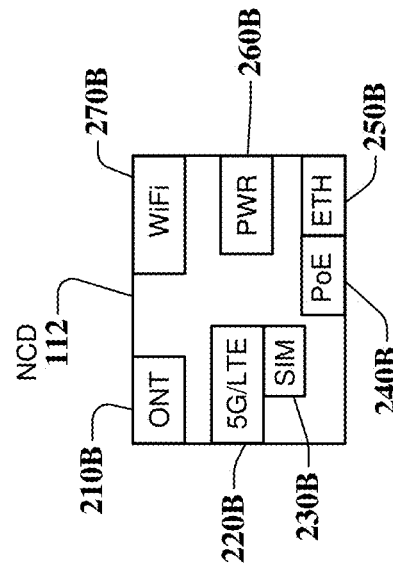
FIG. 2B is a block diagram illustrating an example, non-limiting embodiment of a network communication device in accordance with various aspects described herein.
Figure 2C:
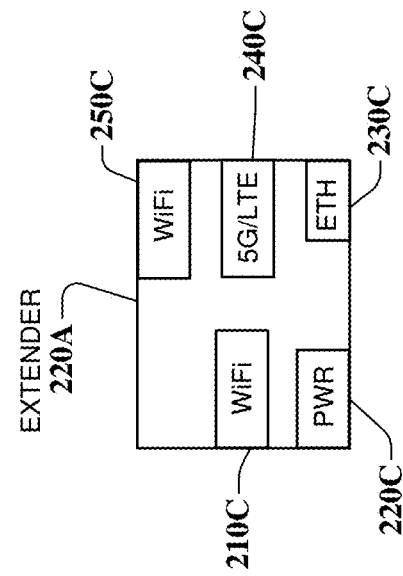
FIG. 2C is a block diagram illustrating an example, non-limiting embodiment of an extender device in accordance with various aspects described herein.
Figure 2A:
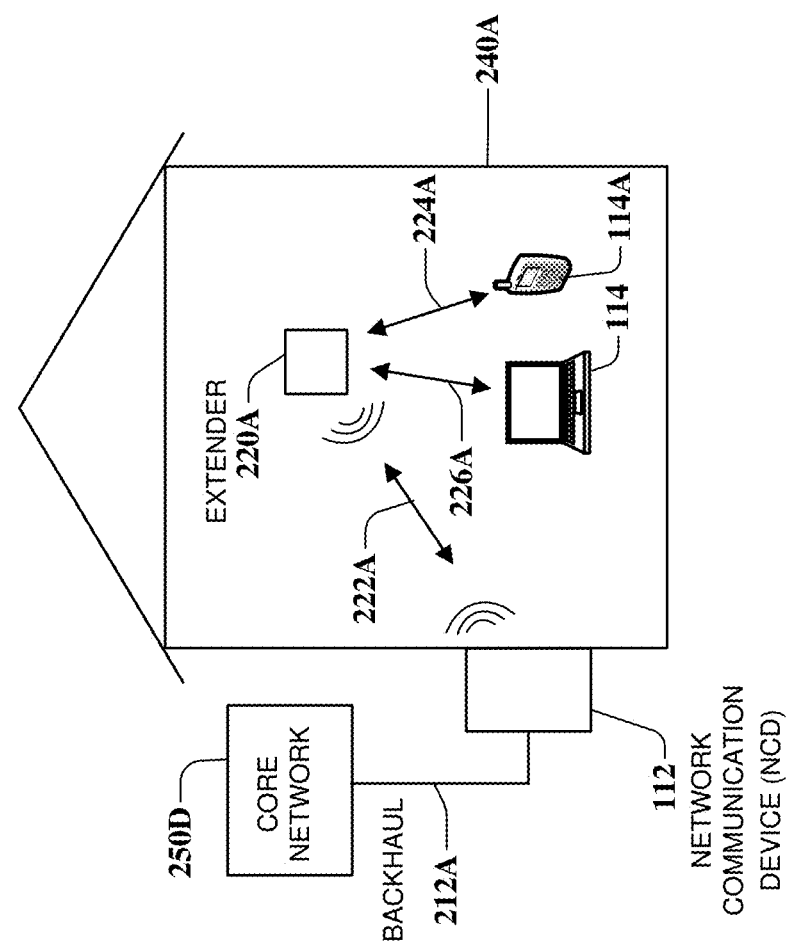
FIG. 2A is a block diagram illustrating an example, non-limiting embodiment of a network communication device providing broadband service to a dwelling in accordance with various aspects described herein.

FIG. 2A is a block diagram illustrating an example, non-limiting embodiment of a network communication device providing broadband service to a dwelling in accordance with various aspects described herein. Network communication device 112 is shown on the outside of a dwelling 240A, therefore the installation does not require an indoor technician visit to drill though the exterior wall. Network communication device 112 connects to a core network 250D via a backhaul link 212A and provides wireless access to the interior of dwelling 240A. For example, a wireless link 222A is shown connecting network communication device 112 to extender device 220A. In some embodiments, network communication device 112 provides broadband services to extender devices associated with a user account of a broadband customer. For example, a data terminal (e.g., laptop computer) such as data terminal 114 may associate to extender device 220A and receive broadband services relayed over the wireless link 222A. As described further below, data terminal 114 may connect to extender device 220A via a wired or wireless link. Also for example, user equipment 114A may also connect to extender 220A via link 224A and receive broadband services. In addition to broadband services, user equipment 114A may also receive mobility services while connected to extender device 220A.

As used herein, "broadband services" refers to services typically associated with internet access services provided to dwellings. For example, broadband services may be provided by a fixed wireline cable or fiber to a dwelling, and may be governed by a contract between a service provider and a consumer providing a minimum or maximum data rate. An example may include a cable terminating at a residential gateway with minimum or maximum data rates of 25 megabits per second (Mbps), 100 Mbps, 1000 Mbps, or any other data rate. Another example may include an optical fiber to a dwelling, an optical network terminal (ONT), and a residential gateway with minimum or maximum data rates of 25 Mbps, 100 Mbps, 1000 Mbps or any other data rate.

As used herein, "mobility services" refers to services typically associated with services provided to mobile devices. For example, mobility services may be provided to mobile devices such as user equipment (UE) that connect to a service provider's radio access network (RAN) to receive cellular services such as voice, short message service (SMS), and data. Mobility services may be governed by a contract between the service provider and a consumer, where the contract specifies terms such as a number of mobile devices covered, a maximum data rate, a maximum data allotment per unit time (e.g., 5 Gbytes/month) and the like.

In the environment depicted in FIG. 2A, a service provider may provide broadband services to broadband customers, and mobility services to mobility customers. For example, a service provider may contract with a consumer to provide broadband data services to one or more dwellings of the consumer, making that consumer a broadband customer of the service provider. Also for example, the service provider may contract with a consumer to provide mobility services such as cell phone connectivity services to mobile devices or user equipment registered to the consumer, making that consumer a mobility customer.

The service provider may maintain user accounts associated with broadband customers. User accounts associated with broadband customers may maintain any information pertinent to the broadband customer or the account of the broadband customer. For example, a broadband customer user account may include billing information, site location, data rates, permissions related to broadband service, and the like. Also for example, a broadband customer user account may maintain lists of MAC addresses of extender devices registered to the broadband customer. For example, extender device 220A may include a Wi-Fi device (having a MAC address) that associates to a Wi-Fi access point within network communication device 112. As further explained below, the service provider may maintain a list of MAC addresses registered to a particular broadband customer, or otherwise maintained in the broadband customer user account, and limit the extender devices that can associate to a Wi-Fi access point within network communication device 112 based on the list of MAC addresses.

The service provider may also maintain user accounts associated with mobility customers. User accounts associated with mobility customers may maintain any information pertinent to the mobility customer or the account of the mobility customer. For example, a mobility customer user account may include billing information, subscriber identity module (SIM) information, user equipment international mobile subscriber identity (IMSI), user equipment location, permissions related to mobility service, and the like.

In some embodiments, consumers may be both broadband customers and mobility customers. For example, a particular consumer may be both a broadband customer and a mobility customer of the service provider and separate user accounts for broadband service and mobility service may be maintained by the service provider, or a single user account may be maintained for both broadband service and mobility service for this particular customer. Also for example, a broadband customer may contract with a service provider to receive broadband services using a network communication device such as network communication device 112 without contracting for mobility services from the same service provider. Also for example, a mobility customer may contract with the service provider to receive mobility services such as cell phone services without contracting for broadband services from the same service provider.

In some embodiments, network communication device 112 is a device that is deployed to a location outside of a building such as dwelling 240A, thereby not requiring wiring to be extended from outside the dwelling to inside the dwelling. This results in an outdoor device that converges backhaul connectivity with a residential gateway that can be installed by a technician without requiring access to the interior of dwelling 240A.

As further explained below, network communication device 112 provides broadband access services to one or more broadband customers of the service provider and also provides mobility services to one or more mobility customers of the service provider. FIG. 2A shows user equipment 114A receiving mobility services within dwelling 240A in a manner similar to receiving broadband service; however, the various aspects of this disclosure are not limited in this respect. For example, user equipment 114A may connect directly to a Wi-Fi access point in network communication device 112 to receive Wi-Fi roaming mobility services. These and other embodiments are described further below.

FIG. 2B is a block diagram illustrating an example, non-limiting embodiment of a network communication device in accordance with various aspects described herein. As shown in FIG. 2B, network communication device 112 includes a backhaul link circuit such as optical network terminal 210B or 5G/LTE radio 220B. These backhaul link circuits are provided as examples, and the various embodiments are not limited in this respect. For example, any circuit capable of supporting a backhaul link may be incorporated within network communication device 112. In some embodiments, network communication device 112 includes a subscriber identity module (SIM) that identifies network communication device to a backhaul link that connects to a radio access network (RAN) such as when 5G/LTE radio 220B connects to a RAN to form a backhaul link. These and other embodiments are described further below.

Network communication device 112 also includes Wi-Fi access point 270B. Wi-Fi access point 270B is coupled to the backhaul link circuit in a manner that allows data traffic from multiple devices connected to Wi-Fi access point 270B to be aggregated on the backhaul link. In some embodiments, Wi-Fi access point 270B operates in an unlicensed spectrum such as 2.4 GHz, 5 GHz, or 6 GHz. Further, in some embodiments, Wi-Fi access point 270 operates in the 6 GHz spectrum to communicate with extender devices, whereas the extender devices operate in the 2.4 GHz and/or 5 GHz spectrum while communicating with data terminals.

Network communication device 112 is also shown with power supply 260B. In some embodiments, power supply 260B is a switching power supply or linear power supply to power the various circuits within network communication device 112. Power supply 260B may accept power at any AC or DC voltage. For example, in some embodiments, power supply 260B may include a switching power supply that rectifies and filters 120 volts at 60 Hertz and produces appropriate voltages to power the remaining circuits within network communication device 112.

Network communication device 112 may also include a Power over Ethernet (PoE) circuit 240B coupled to an Ethernet circuit 250B. Power over Ethernet circuit 240B may extract power that is provided over an Ethernet cable coupled to Ethernet circuit 250B. In some embodiments, power supply 260B and Power over Ethernet circuit 240B are coupled in parallel such that either may provide power to the various circuits within network communication device 112.

Network communication device 112 may also include a processing circuit, a memory, and other circuits. In some embodiments, the processing circuit may execute instructions that are stored in the memory and perform operations associated with the backhaul link circuit and the Wi-Fi access point. These and other embodiments are described further below with reference to later figures.

FIG. 2C is a block diagram illustrating an example, non-limiting embodiment of an extender device in accordance with various aspects described herein. Extender device 220A includes a first Wi-Fi circuit 210C and a second Wi-Fi circuit 250C. In some embodiments, Wi-Fi circuit 210C operates as a client device and associates to a Wi-Fi access point within network communication device 112. For example, as shown in FIG. 2A, extender device 220A may communicate with network communication device 112 over wireless link 222A, where wireless link 222A connects Wi-Fi access point 270B within network communication device 112 with Wi-Fi circuit 210C acting as a client device within extender device 220A.

Extender device 220A is also shown including 5G/LTE radio 240C. In some embodiments, radio 240C is used to provide mobility services to mobility customers from extender device 220A. For example, referring back to FIG. 2A, extender device 220A may provide mobility services to user equipment 114A over wireless link 224A, where wireless link 224A may connect radio 240C to a compatible radio within user equipment 114A. User equipment such as user equipment 114A may establish a wireless link with extender device 220A using either a cellular radio such as radio 240C or a wireless access point such as Wi-Fi circuit 250C.

Extender device 220A includes power supply 220C. Power supply 220C may be a switching power supply or linear power supply to supply power to the various circuits within extender device 220A. For example, in some embodiments, power supply 220C may include a switching power supply that rectifies 120 volts at 60 Hertz and produces appropriate voltages to power the circuits within extender device 220A.

In some embodiments, extender device 220A includes Ethernet circuit 230C. Ethernet circuit 230C may be coupled to any of Wi-Fi circuit 210C, Wi-Fi circuit 250C, or radio 240 C, to provide connectivity to additional devices over a wired Ethernet link. For example, a computer such as data terminal 114 in FIG. 2A may be coupled to extender device 220A via an Ethernet cable, and network communication device 112 can provide broadband services wirelessly to extender device 220A which in turn provides the same broadband services to the data terminal over a wired Ethernet link.

Figure 2D:
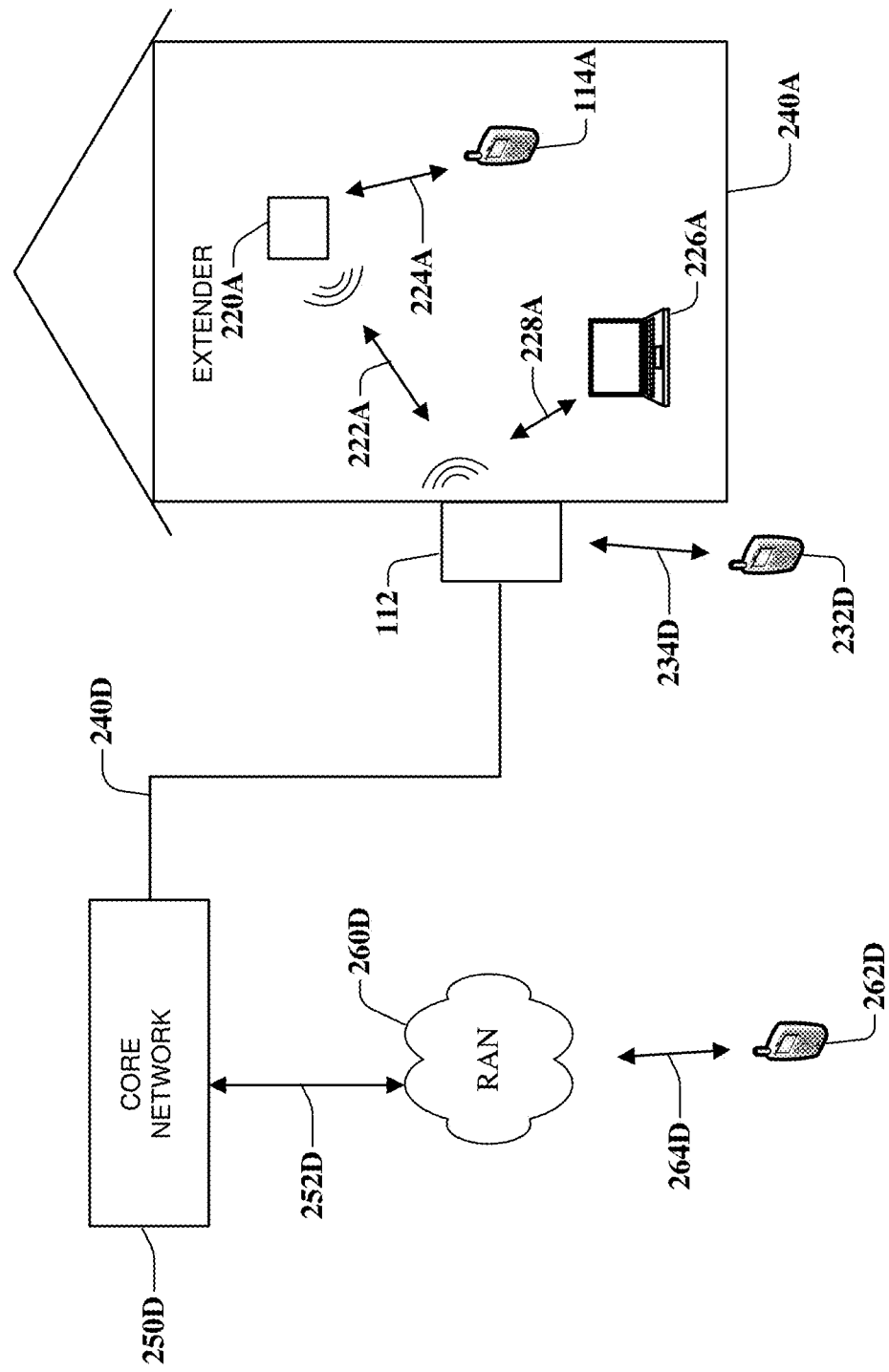
FIG. 2D is a block diagram illustrating an example, non-limiting embodiment of a network communication device with a core network using a wired backhaul link and providing services to broadband customers and mobility customers in accordance with various aspects described herein.

FIG. 2D is a block diagram illustrating an example, non-limiting embodiment of a network communication device with a core network using a wired backhaul link and providing services to broadband customers and mobility customers in accordance with various aspects described herein. FIG. 2D shows dwelling 240A including extender device 220A inside and network communication device 112 outside. Extender device 220A is shown providing broadband services and/or mobility services to user equipment 114A over link 224A. In embodiments represented by FIG. 2D, backhaul link 240D connecting network communication device 112 to core network 250D is a wired backhaul link. Examples of wired backhaul links include cables, wires, and optical fibers.

FIG. 2D also shows core network 250D, radio access network 260D coupled to core network 250D over link 252D, user equipment 262D, and user equipment 232D. Core network 250D represents any core communications network implemented by a service provider. For example, core network 250D may be implemented as communications network 125 (FIG. 1), virtualized network function cloud 325 described below with reference to FIG. 3, mobile network platform 510 described below with reference to FIG. 5, or the like. In some embodiments, core network 250D is implemented as a 3GPP 5G core network.

Core network 250D is operated by a service provider that provides broadband services to broadband customers, and mobility services to mobility customers. For example, the service provider operating core network 250D provides broadband services to dwelling 240A by virtue of network communication device 112 being located such that wireless access is provided to extender device 220A which is registered to a broadband customer. Also for example, the service provider operating core network 250D provides mobility services to user equipment such as user equipment 262D connected to radio access network 260D over link 264D.

In some embodiments, broadband services may also be provided by direct wireless connection between the access point within network communication device 112 and a broadband access device. For example, data terminal 226A is shown connected to the Wi-Fi access point within network communication device 112 by wireless link 228A. In general, broadband services may be provided to devices that connect to extender devices or connect directly to network communication devices.

As shown in FIG. 2D, user equipment 232D receives mobility services from network communication device 112 over link 234D. In some embodiments, user equipment 232D connects to a wireless access point within network communications device 112, and network communications device 112 provides mobility services to user equipment 232D in the form of Wi-Fi roaming. In some embodiments, network communication device 112 limits accessibility of mobility services to user equipment associated with mobility customers of the service provider. For example, if a piece of user equipment requests to associate with the Wi-Fi access point within network communication device 112, network communication device 112 may first verify that the user equipment is registered to a mobility customer by accessing a mobility customer user account. If the user equipment is registered to a valid mobility customer, then network communication device 112 may allow the user equipment to associate to the Wi-Fi access point and provide mobility services. If, on the other hand, the user equipment is not found to be registered to a valid mobility customer, then network communication device 112 may deny access to the Wi-Fi access point.

In some embodiments, network communication device 112 may provide broadband services under a service level agreement (SLA) that guarantees a minimum data rate or bandwidth (the "SLA bandwidth"), where the SLA bandwidth is less than a total bandwidth available to network communication device 112. In some embodiments, the difference between the total available bandwidth and the SLA bandwidth represents bandwidth available to provide mobility services to user equipment such as user equipment 232D without impacting broadband services provided to broadband customers. As an example, network communication device 112 may be capable of data rates on the order of hundreds of gigabits per second, and a service level agreement with a broadband customer may require the network communication device to provide hundreds of megabits per second to the broadband customer. The remaining bandwidth may be utilized for other communications such as providing mobility services to mobility customers without impacting the service level agreement with broadband customers.

In some embodiments, network communication device 112 provides seamless roaming to mobility customers of the service provider. For example, user equipment 262D may be communicating with radio access network 260D, and then may physically pass near a network communication device 112 located to provide broadband services to the building or dwelling. Based on signal strength or any other criteria, user equipment 262D may automatically associate to the Wi-Fi access point within network communication device 112 and receive mobility services over Wi-Fi roaming without intervention by the mobility customer in possession of the user equipment. In some embodiments, this may be controlled by the mobility customer in possession of the user equipment or may be controlled by a central authority within the service provider's core network. For example, a user may have the option of allowing Wi-Fi roaming, and may further have the option to limit Wi-Fi roaming to network communication devices that provide broadband services to broadband customers of the same service provider that provides mobility services to the user equipment. Also for example, the service provider may provision user equipment to automatically associate to Wi-Fi access points in network communication devices that provide both broadband services and mobility services. In some embodiments, this is a premium service for which the service provider may upcharge, and in other embodiments, it is part of a base service that is used to increase mobility service network coverage without modifying a radio access network to cover a geographical area that would otherwise be covered by network communication device 112.

Figure 2E:
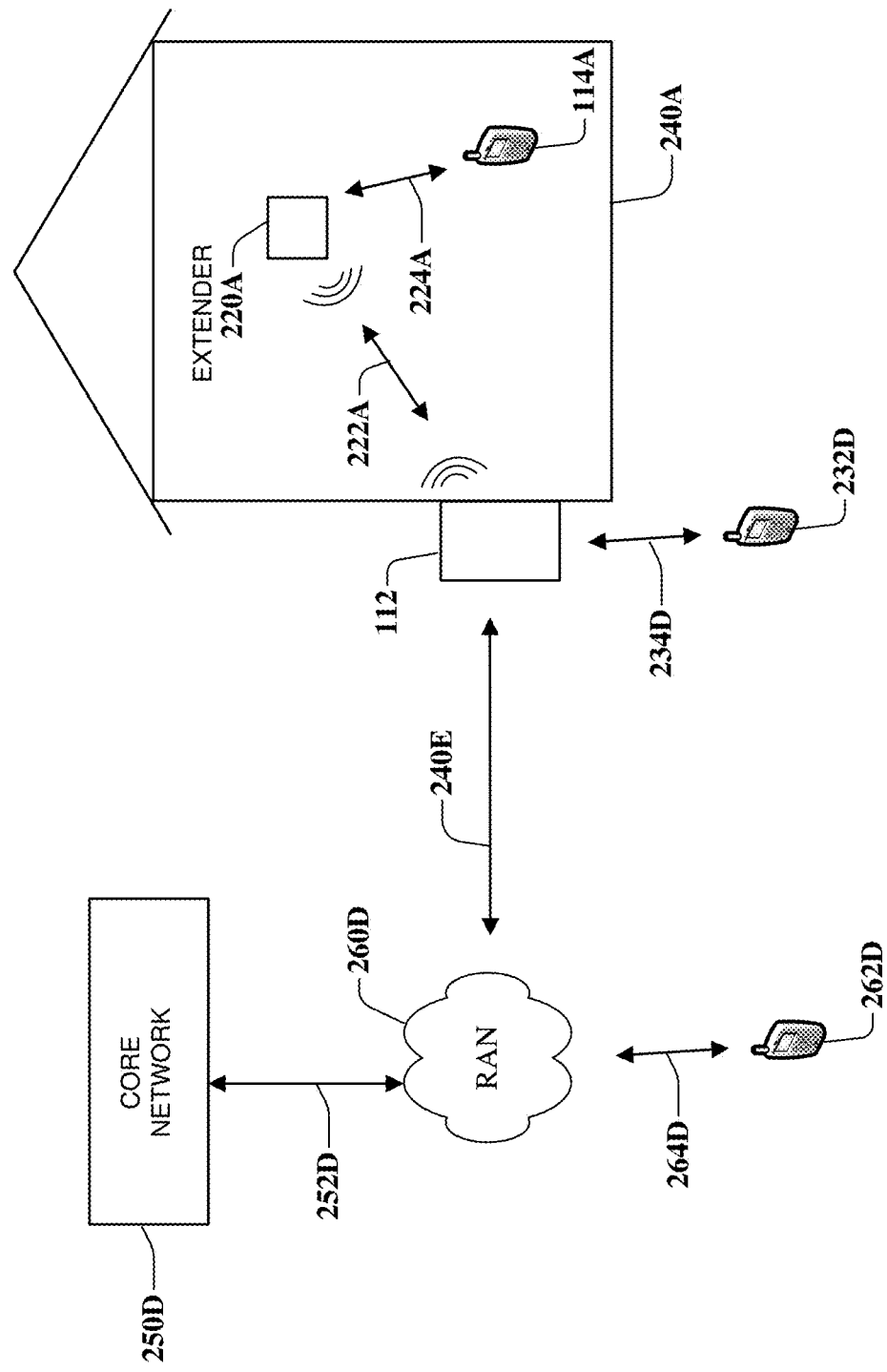
FIG. 2E is a block diagram illustrating an example, non-limiting embodiment of a network communication device with a core network using a wireless backhaul link and providing services to broadband customers and mobility customers in accordance with various aspects described herein.

FIG. 2E is a block diagram illustrating an example, non-limiting embodiment of a network communication device with a core network using a wireless backhaul link and providing services to broadband customers and mobility customers in accordance with various aspects described herein. As shown in FIG. 2E, network communication device 112 communicates with radio access network 260D over wireless backhaul link 240E. In some embodiments, this is performed by a radio circuit within network communication device 112 such as 5G/LTE radio 220B communicating with a radio access network in a manner similar to a user equipment communicating with the radio access network. In these embodiments, a subscriber identity module (SIM) may be included within network communication device 112, where the SIM identifies one or more broadband customers to which network communication device 112 provides broadband services.

Figure 2F:
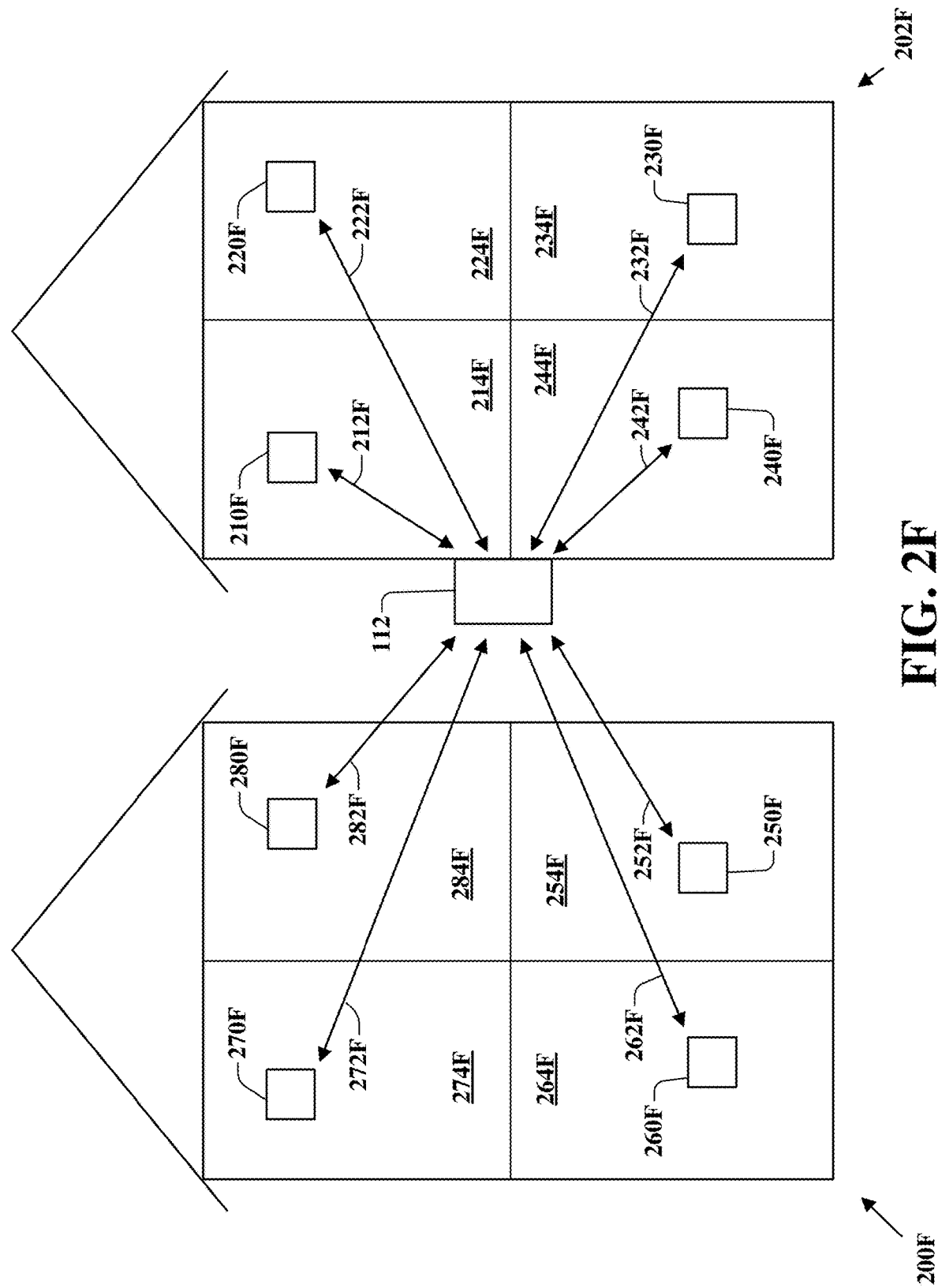
FIG. 2F is a block diagram illustrating an example, non-limiting embodiment of a network communication device providing broadband service to a multi-dwelling building and to adjacent buildings in accordance with various aspects described herein.

FIG. 2F is a block diagram illustrating an example, non-limiting embodiment of a network communication device providing broadband service to a multi-dwelling building and to adjacent buildings in accordance with various aspects described herein. As shown in FIG. 2F, network communication device 112 may be located to provide broadband services to multiple broadband customers in a multi-dwelling building. For example, building 202F may be an apartment building or condominium complex that include dwellings 214F, 224F, 244F, and 234F, where each dwelling houses a broadband customer. Each of the dwellings within building 202F are shown with a single extender device. For example, dwelling 214F includes extender device 210F, dwelling 224F includes extender device 220F, dwelling 244F includes extender device 240F, and dwelling 234F includes extender device 230F. Each of the dwellings within building 202F and the associated extender devices may operate in accordance with the principles described above with reference to FIGS. 2A-2E.

FIG. 2F also shows network communication device providing broadband services to adjacent buildings. For example, network communication device 112 provides broadband services to dwellings within building 202F as well as dwellings within building 200F. For example, building 200F may be an apartment building or condominium complex that includes dwellings 274F, 284F, 264F, and 254F, where each dwelling houses a broadband customer. Each of the dwellings within building 200F are shown with a single extender device. For example, dwelling 274F includes extender device 270F, dwelling 284F includes extender device 280F, dwelling 264F includes extender device 260F, and dwelling 254F includes extender device 250F. Each of the dwellings within building 200F and the associated extender devices may operate in accordance with the principles described above with reference to FIGS. 2A-2E.

Although not specifically shown in FIG. 2F, network communication device 112 may provide mobility services to mobility customers of the service provider that provides broadband services to the various dwellings shown in FIG. 2F. For example, a user equipment belonging to any of the mobility customers of the service provider may associate to a Wi-Fi access point within network communication device 112 to receive mobility services via Wi-Fi roaming. As described above, each of the broadband customers receiving broadband services from network communication device 112 may have an SLA bandwidth. In some embodiments, the total bandwidth available to network communication 112 may be greater than the sum of the SLA bandwidths of the broadband customers serviced by network communication device 112, and the difference between the total available bandwidth and the sum of the SLA bandwidths provides additional bandwidth available to provide mobility services to mobility customers of the service provider when they are associated to a Wi-Fi access point within network communication device 112.

In some embodiments, network communication device 112 may be physically located on the exterior of a multi-dwelling building such as shown in FIG. 2F where network communication device 112 is physically located on the exterior of building 202F. In some embodiments, network communication device 112 is located in a publicly accessible interior space of building 202F. In these embodiments, an installation technician may have access to the location at which network communication device 112 is installed without requiring physical access inside any particular dwelling unit.

Figure 2G:
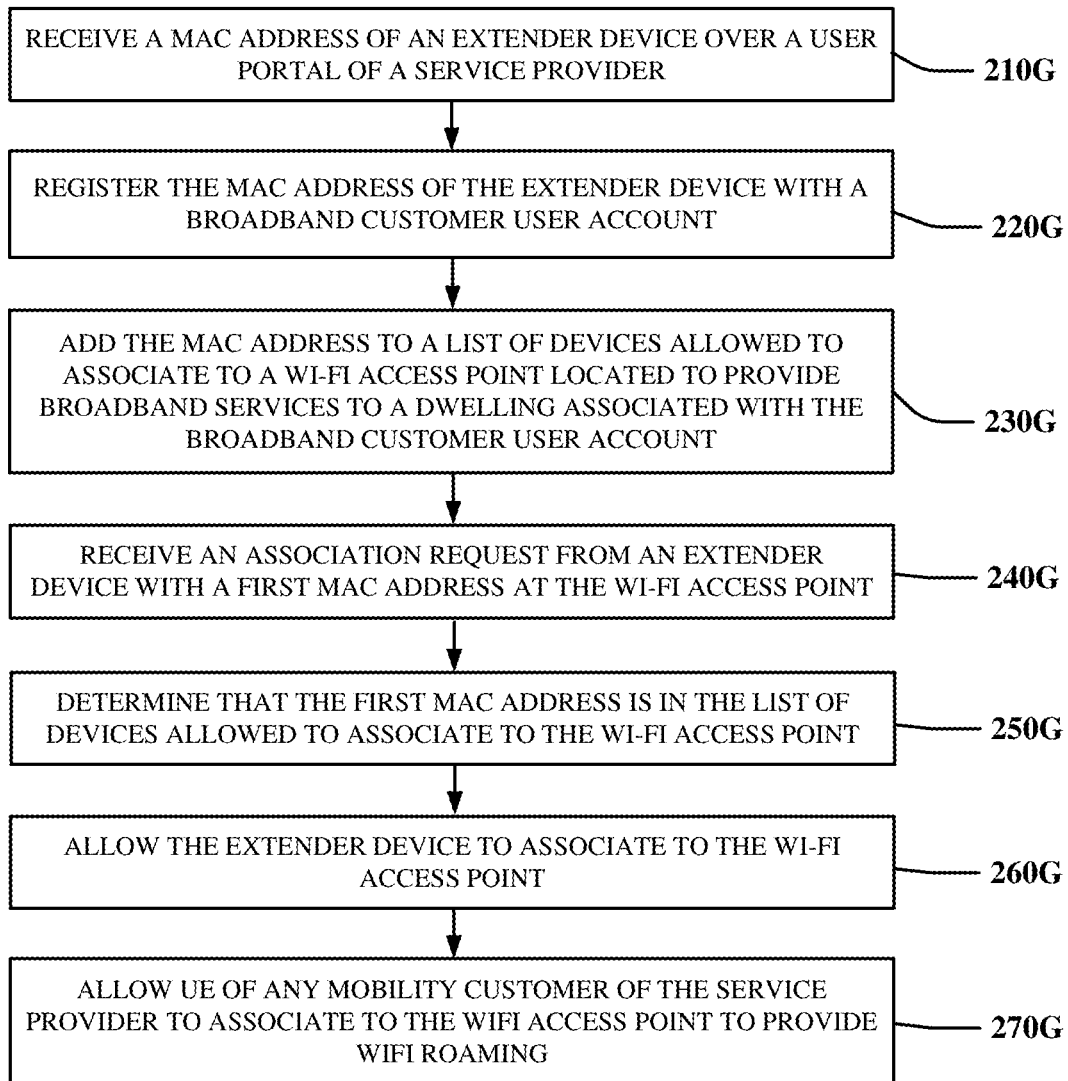
FIG. 2G depicts an illustrative embodiment of a method in accordance with various aspects described herein.

FIG. 2G depicts an illustrative embodiment of a method in accordance with various aspects described herein. At 210G, a MAC address of an extender device is received over a user portal of a service provider. In some embodiments, this corresponds to a broadband customer logging into an online user portal provided by a service provider to register an extender device that was either provided to the broadband customer by the service provider or purchased separately by the broadband customer. For example, referring to FIG. 2A, a service provider may provide extender device 220A to a broadband customer that receives broadband services from network communication device 112 at dwelling 240A. The broadband customer may then log in to an online user portal provided by the service provider and enter a MAC address of extender device 220A. In some embodiments, a broadband customer may obtain multiple extender devices to deploy within a single dwelling, and the broadband customer may log in and provide MAC address of each of the multiple extender devices.

At 220G, the MAC address of the extender device is registered to a broadband customer. For example, a service provider may associate the MAC address of the extender device with a broadband customer user account by adding the MAC address of the extender device to a list within the broadband customer user account.

At 230G, the MAC address is added to a list of devices allowed to associate to a Wi-Fi access point located to provide broadband services to a dwelling associated with the broadband customer user account. In some embodiments, a broadband customer user account may include more than one list of devices allowed to associate to a Wi-Fi access point. For example, a first list of devices may correspond to devices having a first set of capabilities or permissions, and a second list of devices may correspond to devices having a second set of capabilities or permissions. Any number of devices may be associated with a broadband customer user account, and any number of device lists may also be maintained in a broadband customer user account.

In some embodiments, as described above, a broadband customer may also be a mobility customer. In these embodiments, the broadband customer user account may include information relating to both broadband services and mobility services of that particular customer. In these embodiments, the list of devices allowed to associate to the Wi-Fi access point may include extender devices as well as other user equipment registered to a mobility customer.

In embodiments represented by FIG. 2G, devices are identified by their MAC addresses, and they are allowed to associate or refused association to a Wi-Fi access point based on their MAC address. In some embodiments, other identifiers are used to identify devices such as extender devices and mobility devices to either grant access or refuse access to associate to a Wi-Fi access point.

In some embodiments the list of devices allowed to associate to the Wi-Fi access point is maintained in a central location by the service provider. In other embodiments, the list of devices allowed to associate to the Wi-Fi access point are maintained within the access point, and the list may be updated remotely by the service provider. In general, lists of devices allowed to associate to a Wi-Fi access point as well as broadband customer user accounts may be maintained centrally or in a distributed manner and may be located in any storage device at any location.

Actions listed at 210G, 220G, and 230G represent embodiments in which a user provides the MAC address of an extender device to the service provider. In other embodiments, a service provider may provide the extender device to a broadband customer after having already registered the MAC address of the extender device to the broadband customer. In these embodiments, the customer may not log in and provide the MAC address separately. For example, a service provider may provide an extender device having a known MAC address and that known MAC address may be associated to a broadband customer user account and placed in a list of devices allowed to associate to a Wi-Fi access point without further interaction with the broadband customer.

At 240G, an association request is received from an extender device having a first MAC address. Referring now back to FIG. 2A, this may correspond to extender device 220A requesting to associate to a Wi-Fi access point within network communication device 112. At 250G, the list of devices allowed to associate to the Wi-Fi access point is consulted to determine whether the first MAC address is in the list of devices. Once it is determined that the first MAC addresses in the list of devices allowed to associate the Wi-Fi access point, the extender device is allowed to associate to the Wi-Fi access point at 260G. The actions of 250G and 260G may be performed by a network communication device such as network communication device 112, or may be performed by a Wi-Fi access point such as a Wi-Fi access point within a network communication device, or they may be performed more centrally by a service provider at any location other than the network communication device.

In some embodiments, multiple extender devices having different MAC addresses request association to the Wi-Fi access point at 240G. In these environments, if each of the multiple extender devices is identified in the list of allowed devices at 250G, then each of the multiple extender devices will be allowed to associate to the Wi-Fi access point at 260G. If, on the other hand, not all of the multiple extender devices are listed as devices allowed to associate to the Wi-Fi access point at 250G, then only those extender devices listed as being allowed to associate the Wi-Fi access point are then allowed to associate the Wi-Fi access point at 260G.

In some embodiments, the multiple extender devices form a mesh network in which each of the multiple extender devices communicates with each other, and in other embodiments, each of the multiple extender devices is a standalone device that communicates only with a network communication device such as network communication device 112.

At 270G, user equipment of any mobility customer of the service provider is allowed to associate to the Wi-Fi access point to provide Wi-Fi roaming. In some embodiments, the mobility customer may be the same customer as the broadband customer associating extender devices to the Wi-Fi access point. In other embodiments, the mobility customer may be a separate customer. In these embodiments, the mobility customer would not necessarily have access to connect to an extender device of the broadband customer or to associate to an extender device belonging to the mobility customer to the Wi-Fi access point; however, by virtue of being a mobility customer of the service provider, the mobility customer may associate the user equipment directly to the Wi-Fi access point of the network communication device so that the service provider may provide Wi-Fi roaming services to the mobility customer.

In some embodiments, mobility customers may manage this interaction by allowing or disallowing Wi-Fi roaming on their user equipment. For example, a mobility customer may allow all Wi-Fi roaming or may limit Wi-Fi roaming to only network communication devices deployed by the service provider. In these embodiments, the handoffs between radio access networks and Wi-Fi access points within network communication devices deployed by the service provider may be seamless and allow a mobility customer to benefit from increased coverage areas when roaming from and between a radio access network and network communication devices deployed in and near dwellings and buildings.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part a network communication device that combines a backhaul link circuit and a wireless access point to provide both broadband services to broadband customers and mobility services to mobility customers.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
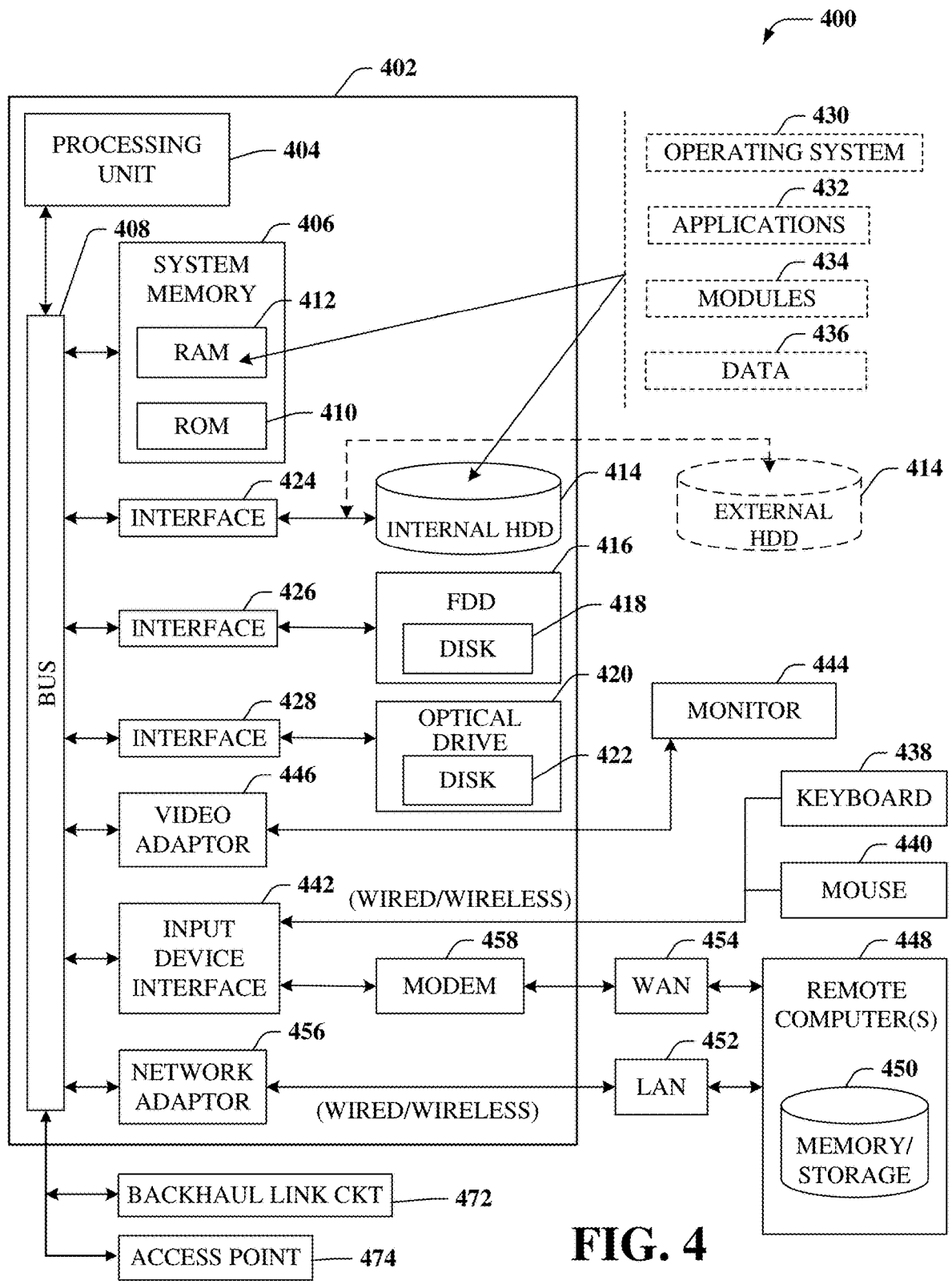
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, network communication device 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a network communication device that combines a backhaul link circuit and a wireless access point to provide both broadband services to broadband customers and mobility services to mobility customers.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In some embodiments, backhaul link circuit 472 communicates with a service provider's core network over a backhaul link. Example backhaul link circuits include an optical network terminal (ONT), a cable modem, and a radio to communicate with a radio access network. Example radios include 3GPP-compliant radios to communicate using 5G and/or LTE protocols. Backhaul link circuits are also described above with reference to FIGS. 2A-2G.

In some embodiments, access point 474 communicates with extender devices to provide broadband services to broadband customers of the service provider, and access point 474 communicates with UEs of mobility customers to provide mobility services using Wi-Fi roaming. Wi-Fi access points providing both broadband services and mobility services are also described above with reference to FIGS. 2A-2G.

Figure 5:
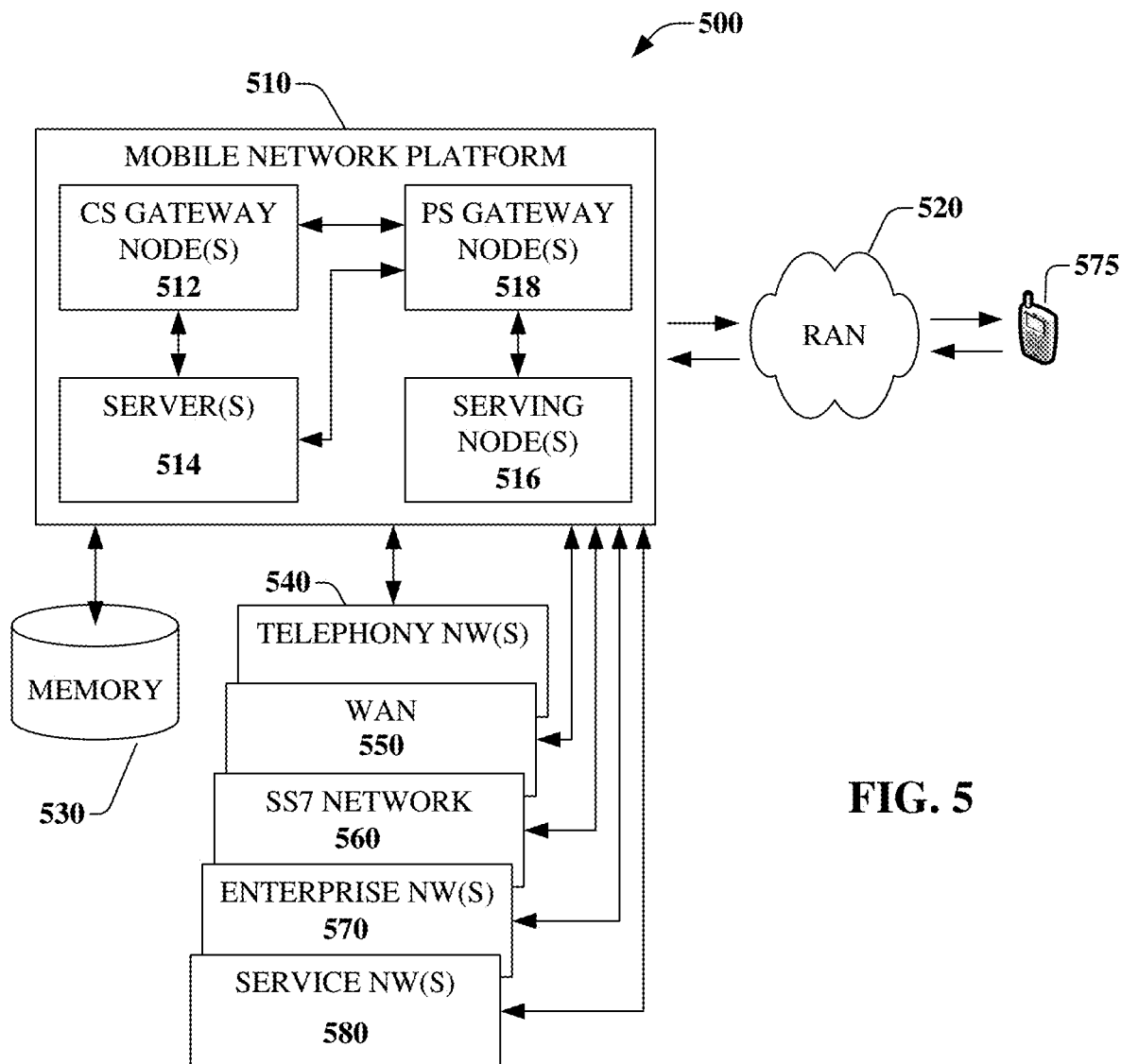
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a network communication device that combines a backhaul link circuit and a wireless access point to provide both broadband services to broadband customers and mobility services to mobility customers. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
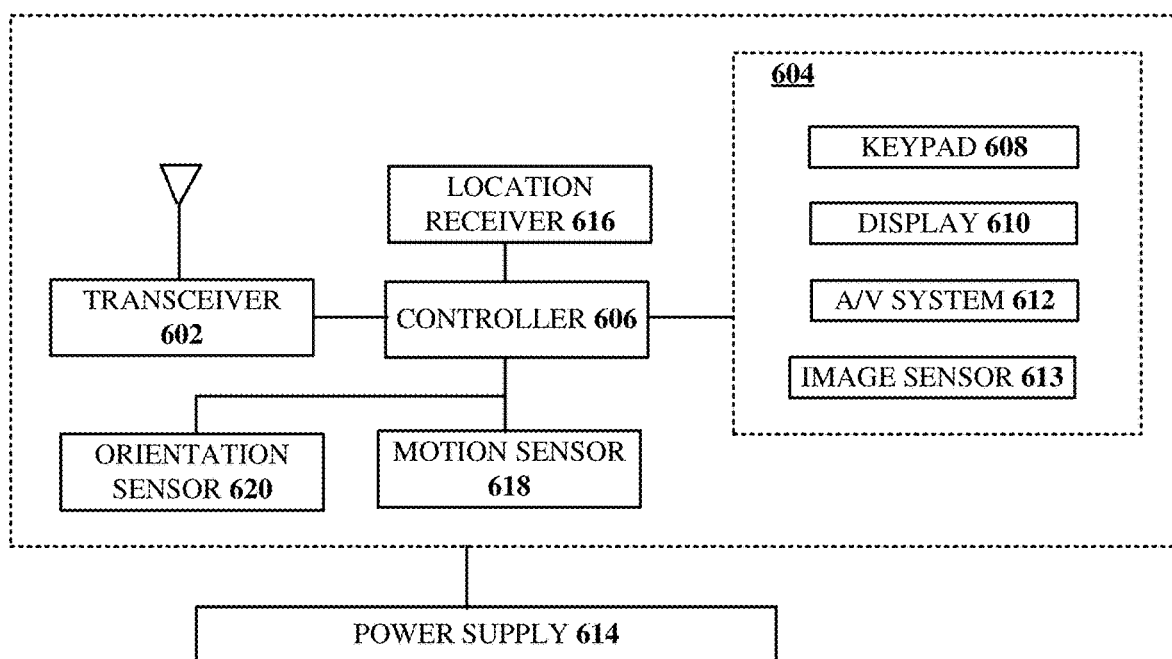
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a network communication device that combines a backhaul link circuit and a wireless access point to provide both broadband services to broadband customers and mobility services to mobility customers.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A network communication device comprising:
   a backhaul link circuit configured for communication with a core network of a service provider, wherein the core network provides broadband services to dwellings of broadband customers of the service provider and provides mobile data services to user equipment (UE) devices of mobility customers of the service provider; and
   a Wi-Fi access point in data communication with the backhaul link circuit, wherein the Wi-Fi access point is configured to associate with two or more extender devices having MAC addresses registered to two or more of the broadband customers of the service provider, the Wi-Fi access point configured to receive from each respective extender device of the two or more extender devices a respective request to associate with the Wi-Fi access point, each respective extender device having a respective MAC address registered to a different respective broadband customer of the two or more of the broadband customers.

2. The network communication device of claim 1 wherein the Wi-Fi access point is configured to limit the two or more extender devices with which the Wi-Fi access point associates to extender devices having MAC addresses registered to a single broadband customer of the service provider.

3. The network communication device of claim 2 wherein the Wi-Fi access point is configured to associate with any UE device of any of the mobility customers of the service provider.

4. The network communication device of claim 1 wherein the Wi-Fi access point is configured to limit the two or more extender devices with which the Wi-Fi access point associates to extender devices having MAC addresses registered to broadband customers in a multi-dwelling building.

5. The network communication device of claim 4 wherein the Wi-Fi access point is configured to associate with any UE device of any of the mobility customers of the service provider.

6. The network communication device of claim 1 wherein the Wi-Fi access point is configured to limit the two or more extender devices with which the Wi-Fi access point associates to extender devices having MAC addresses registered to broadband customers in adjacent buildings.

7. The network communication device of claim 1 wherein the Wi-Fi access point is configured to receive one or more respective association requests from one or more respective UE devices of the mobility customers of the service provider.

8. The network communication device of claim 7 wherein the Wi-Fi access point is further configured to associate with the one or more respective UE devices of the mobility customers of the service provider to provide Wi-Fi roaming to the one or more respective UE devices of the mobility customers of the service provider.

9. The network communication device of claim 1 wherein the backhaul link circuit comprises an optical network terminal (ONT) for data communication with the core network of the service provider.

10. The network communication device of claim 9 wherein the network communication device is installed outside of a dwelling unit, and wherein the Wi-Fi access point is configured to associate with the two or more extender devices using a wireless link that penetrates a wall of the dwelling unit.

11. The network communication device of claim 1 wherein the backhaul link circuit comprises a wireless communication circuit for data communication with the core network of the service provider.

12. A method comprising:
    receiving, by a processing system including a processor, over a user portal of a service provider, a MAC address of a first extender device and receiving a MAC address of a second extender device, wherein the service provider provides services to broadband customers and mobility customers;
    registering, by the processing system, the MAC address of the first extender device to a first broadband customer user account and registering the MAC address of the second extender device to a second broadband customer user account; and
    adding, by the processing system, the MAC address of the first extender device and the MAC address of the second extender device to a list of devices allowed to associate to a Wi-Fi access point, wherein the Wi-Fi access point may be located to provide broadband service to a first dwelling associated with the first broadband customer user account and to a second dwelling associated with the second broadband customer user account.

13. The method of claim 12 wherein the method further comprises:
    associating, by the processing system, a user equipment (UE) device of any mobility customer of the service provider with the Wi-Fi access point to provide Wi-Fi roaming to the UE device of any mobility customer.

14. The method of claim 12 wherein the method further comprises:
    storing, by the processing system, the list of devices allowed to associate to the Wi-Fi access point at a central location of the service provider; and
    providing, by the processing system, to the Wi-Fi access point, the list of devices allowed to associate to the Wi-Fi access point.

15. The method of claim 12 wherein the registering the MAC address of the first extender device to a first broadband customer user account is performed prior to providing the first extender device to a broadband customer associated with the first broadband customer user account, and wherein the registering the MAC address of the second extender device to a second broadband customer user account is performed prior to providing the second extender device to a broadband customer associated with the second broadband customer user account.

16. The method of claim 12, wherein the method comprises:

locating the Wi-Fi access point to provide broadband service to the first dwelling and to the second dwelling, wherein the first dwelling and the second dwelling are in adjacent buildings.

17. A non-transitory machine-readable medium, comprising executable instructions that, when executed by a processing system including a processor, facilitate performance of operations, the operations comprising:

associating, by a Wi-Fi access point, to two or more extender devices having MAC addresses registered to two or more of broadband customers of a service provider;

receiving, from each respective extender device of the two or more extender devices, a respective request to associate with the Wi-Fi access point, each respective extender device of the two or more extender devices having a respective MAC address registered to a different respective broadband customer of the two or more of the broadband customers of the service provider;

receiving, by the Wi-Fi access point, one or more respective association requests from one or more respective to user equipment (UE) devices of mobility customers of the service provider;

associating, by the Wi-Fi access point, to the one or more respective UE devices of the mobility customers of the service provider to provide Wi-Fi roaming to the one or more respective UE devices of the mobility customers of the service provider;

providing, by a backhaul circuit in data communication with the Wi-Fi access point, broadband services to dwellings of the broadband customers of the service provider; and providing, by the backhaul circuit, mobile data services of the mobility customers of the service provider.

18. The non-transitory machine-readable medium of claim 17, wherein the operations further comprise:

associating, by the Wi-Fi access point, with the one or more respective UE devices of the mobility customers of the service provider to provide Wi-Fi roaming to the one or more respective UE devices of the mobility customers of the service provider.

19. The non-transitory machine-readable medium of claim 17, wherein the operations further comprise:

limiting the two or more extender devices with which the Wi-Fi access point associates to extender devices having MAC addresses registered to broadband customers in a multi-dwelling building.

20. The non-transitory machine-readable medium of claim 17, wherein the operations further comprise:

limiting the two or more extender devices with which the Wi-Fi access point associates to extender devices having MAC addresses registered to broadband customers in adjacent buildings.

* * * * *